US012578234B2

(12) United States Patent
    Worreth et al.

(10) Patent No.: US 12,578,234 B2
(45) Date of Patent: Mar. 17, 2026

(54) MEASURING DEVICE

(71) Applicant: Endress+Hauser Flowtec AG, Reinach (CH)

(72) Inventors: Bruno Worreth, Kiffis (FR); Sabrina Ulmi, Münchenstein (CH); Jean-Claude Chevrolet, Aesch (CH); Fabian Steiner, Unterentfelden (CH); Beat Tschudin, Reinach (CH)

(73) Assignee: Endress+Hauser Flowtec AG, Reinach (CH)

( * ) Notice: Subject to any disclaimer, the term of this patent is extended or adjusted under 35 U.S.C. 154(b) by 441 days.

(21) Appl. No.: 18/043,624

(22) PCT Filed: Aug. 16, 2021

(86) PCT No.: PCT/EP2021/072745
    § 371 (c)(1),
    (2) Date: Mar. 1, 2023

(87) PCT Pub. No.: WO2022/048901
    PCT Pub. Date: Mar. 10, 2022

(65) Prior Publication Data
    US 2023/0366743 A1      Nov. 16, 2023

(30) Foreign Application Priority Data
    Sep. 1, 2020    (DE) ..................... 10 2020 122 803.1

(51) Int. Cl.
    *G01K 1/14*      (2021.01)
    *G01F 1/60*      (2006.01)
    *G01K 13/02*      (2021.01)

(52) U.S. Cl.
    CPC ............... *G01K 1/14* (2013.01); *G01K 13/02* (2013.01); *G01F 1/60* (2013.01)

(58) Field of Classification Search
    CPC .......... G01K 1/14; G01K 13/02; G01K 1/143; G01K 1/16; G01F 1/60; G01F 1/58; G01F 15/063
    See application file for complete search history.

(56)                References Cited

U.S. PATENT DOCUMENTS

2011/0265320 A1    11/2011   Sisk et al.
    2012/0006907 A1     1/2012   Niemann et al.
    2015/0276503 A1*   10/2015   Grun ........................ G01K 7/18
                                                      374/185

FOREIGN PATENT DOCUMENTS

CN          104736980 A      6/2015
    CN          207866316 U      9/2018
                    (Continued)

*Primary Examiner* — Laura Martin
*Assistant Examiner* — Julia Fitzpatrick
(74) *Attorney, Agent, or Firm* — Kelly J. Smith; Endress+Hauser (USA) Holding, Inc.

(57)                ABSTRACT

A measuring device for determining a process variable of a medium includes a housing comprising a housing body with an inner surface. The measuring device includes a temperature measuring apparatus comprising a first temperature sensor configured to determine a first temperature value, and an evaluation circuit configured to determine a medium temperature as a function of the first temperature value. The measuring device also includes a rigid printed circuit board having a resilient printed circuit board component. The first temperature sensor is arranged on the printed circuit board component. The printed circuit board component at least partially touches the inner surface of the housing body.

20 Claims, 3 Drawing Sheets

(56)         References Cited

FOREIGN PATENT DOCUMENTS

| | | | | | |
|---|---|---|---|---|---|
| DE | 102007005670 | A1 | | 8/2008 | |
| DE | 102012109312 | A1 | * | 4/2014 | ............. G01F 1/588 |
| DE | 102014008821 | A1 | * | 12/2014 | ........... G01D 11/245 |
| DE | 102014008822 | A1 | * | 12/2014 | ............. G01K 13/02 |
| DE | 102015113237 | A1 | * | 2/2017 | ............. G01K 1/143 |
| DE | 112016001172 | T5 | * | 11/2017 | ............... G01K 7/42 |
| DE | 202018104014 | U1 | | 10/2018 | |
| DE | 102018113230 | A1 | | 12/2019 | |
| EP | 1683665 | A1 | | 7/2006 | |
| EP | 2511616 | A1 | | 10/2012 | |
| EP | 3012596 | A1 | * | 4/2016 | ............. G01L 9/065 |
| FR | 2853069 | A3 | | 10/2004 | |
| FR | 3057952 | A3 | * | 4/2018 | ......... H01M 10/486 |
| JP | 2011515669 | A | * | 5/2011 | ........ G01N 33/0031 |
| WO | WO-2018188944 | A1 | * | 10/2018 | ............... G01K 7/16 |

* cited by examiner

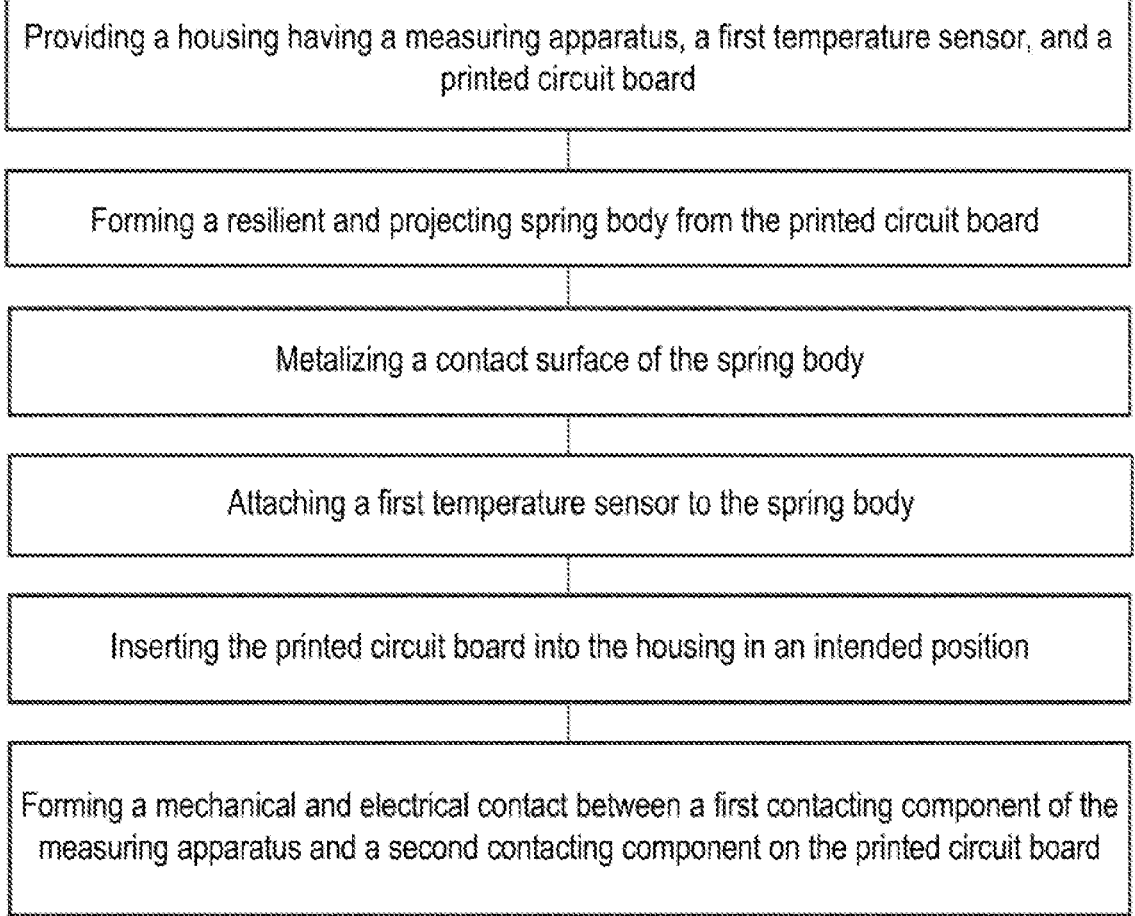

Providing a housing having a measuring apparatus, a first temperature sensor, and a printed circuit board Forming a resilient and projecting spring body from the printed circuit board Metalizing a contact surface of the spring body Attaching a first temperature sensor to the spring body Inserting the printed circuit board into the housing in an intended position Forming a mechanical and electrical contact between a first contacting component of the measuring apparatus and a second contacting component on the printed circuit board

Fig. 5

MEASURING DEVICE

CROSS-REFERENCE TO RELATED APPLICATIONS

The present application is related to and claims the priority benefit of DPMA Patent Application No. 10 2020 122 803.1, filed on Sep. 1, 2020 and International Patent Application No. PCT/EP2021/072745, filed on Aug. 16, 2021, the entire contents of which are incorporated herein by reference.

TECHNICAL FIELD

The invention relates to a measuring device, in particular a measuring device having a housing which at least partially touches medium.

BACKGROUND

In automation technology, particularly in process automation technology, measuring devices serving to detect and/or influence process variables are frequently used. For detecting process variables, sensors that are integrated, for example, into fill-level measuring devices, flow meters, pressure and temperature measuring devices, pH-redox potential meters, conductivity meters, etc., are used to detect the respective process variables, such as fill-level, flow, pressure, temperature, pH level, or conductivity. Actuators, such as, for example, valves or pumps, are used to influence process variables. The flow rate of a fluid in a pipeline section or a fill-level in a container can thus be altered by means of actuators. Measuring devices, in general, refer to all devices which are process-oriented and which supply or process process-relevant information. In connection with the invention, "measuring devices" therefore also refer to remote I/O's, radio adapters, or, in general, electronic measuring components that are disposed at the field level.

A measuring device is in particular selected from a group consisting of flow meters, fill-level measuring devices, pressure measuring devices, temperature measuring devices, limit level measuring devices, and/or analytical measuring devices.

Flow meters are, in particular, Coriolis, ultrasound, vortex, thermal, and/or magnetically-inductive flow meters.

Fill-level measuring devices are, in particular, microwave fill-level measuring devices, ultrasonic fill-level measuring devices, time-domain reflectometry measuring devices, radiometric fill-level measuring devices, capacitive fill-level measuring devices, inductive fill-level measuring devices, and/or temperature-sensitive fill-level measuring devices.

Pressure-measuring devices are, in particular, absolute, relative, or differential-pressure devices.

Temperature measuring devices are, in particular, measuring devices with thermocouples and/or temperature-dependent resistors.

Limit level-measuring devices are, in particular, vibronic limit level measuring devices, ultrasonic limit level measuring devices and/or capacitive limit level measuring devices.

Analytical measuring devices are, in particular, pH sensors, conductivity sensors, oxygen and active oxygen sensors, (spectro-)photometric sensors, and/or ion-selective electrodes.

There are many applications in which the monitoring of a medium temperature for process monitoring is of particular interest. Often, also in connection with further process variables to be monitored. DE 10 2012 109 308 A1, for example, teaches a magnetically-inductive flow meter for determining a flow speed and/or a volumetric flow of an electrically-conductive medium, which additionally has an arrangement inserted in an opening of the measuring tube, consisting of a fill-level monitoring electrode, which touches the medium, and a temperature sensor. The fill-level monitoring electrode has a blind hole in which the temperature sensor is inserted. Although such a solution delivers further process variables, in addition to the medium temperature, this is very complicated and requires at least one further opening in the measuring tube.

The object of the invention is to provide an alternative solution for measuring devices with which it is possible to determine a medium temperature.

SUMMARY

The object is achieved by the measuring device according to the present disclosure.

The measuring device according to the invention for determining a process variable of a medium comprises:
a housing,
    wherein the housing comprises a housing body, in particular a metallic housing body,
    wherein the housing body has an inner surface;
a temperature measuring apparatus,
    wherein the temperature measuring apparatus comprises a first temperature sensor,
    wherein the first temperature sensor is configured to determine a first temperature value,
    wherein the temperature measuring apparatus comprises an evaluation circuit,
    wherein the evaluation circuit is configured to determine a medium temperature as a function of the first temperature value;
a rigid printed circuit board,
    wherein the printed circuit board has a resilient printed circuit board component,
    wherein the first temperature sensor is arranged on the printed circuit board component,
    wherein the printed circuit board component at least partially touches the inner surface of the housing body.

A rigid printed circuit board (PCB) is a carrier for electronic components. It serves for mechanical attachment and electrical connection. Printed circuit boards consist of electrically-insulating material with conductor tracks bonded thereto. Fiber-reinforced plastic is frequently used as the insulating material. The conductor tracks are generally etched from a thin layer of copper. The electronic components are soldered onto solder surfaces or into solder pads. They are thus connected mechanically and electrically at the same time at these locations. Almost every electronic device contains one or more printed circuit boards, and therefore the concept according to the invention can be used in many different measuring devices, and thus a temperature measuring apparatus can easily and favorably be implemented in a conventional measuring device without having to carry out complex conversions. Rigid printed circuit boards usually have a minimum thickness of 0.5 millimeters and often consist of multiple printed circuit board layers.

Flexible printed circuit boards—so-called flex printed circuit boards—differ from rigid printed circuit boards essentially by a comparatively very low material thickness and by a permanent flexibility, which allows three-dimensional structures to be formed. Flex printed circuit boards are generally bendable film circuits based upon polyimide or polyester. Hybrid printed circuit boards are also known, which have flexible regions. Printed circuit boards of this kind are known by the terms, rigid-flex and semi-flex printed circuit boards. Rigid-flex printed circuit boards consist of at least two rigid printed circuit boards or rigid printed circuit board regions, which are connected to one another via a flexible printed circuit board or a flexible printed circuit board region. Thus, a polyimide film can be arranged on or between conventional FR4 layers. Semi-flex printed circuit boards consist of at least one printed circuit board which has a tapered region that is tapered in such a way that flexibility of the printed circuit board is achieved. This is generally achieved by milling printed circuit board layer stacks down to a few layers. However, such printed circuit boards are only used when a non-permanently flexible region is required. The aforementioned flex printed circuit boards and hybrid printed circuit boards differ from rigid printed circuit boards in that they have a material thickness of less than 0.5 millimeters, at least in sections.

The use of the resilient printed circuit board component has the advantage that manufacturing tolerances of the printed circuit board, but also of the housing body, which can be ±0.2 millimeters altogether, can be compensated for, and it can thus be ensured that the printed circuit board component is in mechanical contact with or touches the inner surface of the housing body. Suitable printed circuit board components are separate components which elastically deform when force is applied. One example of suitable printed circuit board components are spring contacts—for example, shielding fingers and grounding springs—which are known to be used for electric low-voltage connections and for grounding on printed circuit boards, in order to prevent electrostatic charging of, for example, loudspeakers, motors, or microphones. Alternatively, the printed circuit board component can also be designed as part of the printed circuit board or of the printed circuit board body.

Temperature sensors are usually electrical or electronic components which provide an electrical signal as a measure of the temperature. According to the invention, NTC (negative temperature coefficient) thermistors, in particular NTC thermistors designed as SMD (surface mounted device) chips, and preferably 0402 NTC thermistors (1005 metric), are suitable for use as the first temperature sensor on the printed circuit board.

Depending upon the dimensioning of the printed circuit board, the use of a PT100 and/or PT1000 resistance thermometer is suitable for the first temperature sensor and further temperature sensors.

In the context of the invention, the feature, "resilient," is understood to mean the bendability or the elastic deformability of the printed circuit board component. That is to say, the printed circuit board component changes its shape or its deflection when force is applied, and the printed circuit board component returns to the original shape or original deflection when the acting force ceases. A thermal contact between the housing body and the first temperature sensor arranged on the printed circuit board component is realized by the mechanical contact between the printed circuit board component and the inner surface of the housing body.

Advantageous embodiments of the invention are the subject matter of the dependent claims.

One embodiment provides for the printed circuit board component to have a spring body,
wherein the printed circuit board has a rigid printed circuit board main body,
wherein the spring body and the printed circuit board main body are formed monolithically.

Printed circuit boards can be processed by means of a machining manufacturing method, for example, in order thus to give the printed circuit board an individual shape, or to produce a desired structure from the printed circuit board main body. An advantageous structure is a recess separated from the rigid printed circuit board main body. This structure forms the printed circuit board component and is referred to below as a spring body. Furthermore, printed circuit boards are generally characterized in that they are elastically bendable when force is applied. As a result, the spring body is also flexible. The mechanical properties, in particular the spring stiffness of the spring body, can be influenced by means of the geometry of the spring body.

One embodiment provides for the spring body to project at least partially from the printed circuit board main body.

Thus, the spring body corresponds to a cantilever. In technical mechanics, a cantilever is a bar, often horizontal, which is mounted on one side and is loaded transversely at its free end or over its entire length.

One embodiment provides for the spring body to be elastically deformable, in particular elastically deformed, at least in a printed circuit board plane.

The printed circuit board main body is at least partially planar and has a printed circuit board plane which also extends through the spring body. The spring body is also planar. In the arranged state of the printed circuit board, preferably only a force effect with a direction vector in the printed circuit board plane acts on the spring body. Torsion of the spring body is thus avoided, and disadvantageous mechanical stresses in the printed circuit board, in particular in the printed circuit board main body, are reduced.

One embodiment provides for the spring body to have, in the longitudinal direction of the spring body, an extension with a length L,
the length L assuming a value between 5 and 20 millimeters.

Due to the intrinsic mechanical properties, i.e., the modulus of elasticity of the printed circuit board used, in particular when a printed circuit board of class FR-4 is used, a length L between 5 and 20 millimeters has proven advantageous compared with dimensions deviating therefrom. FR-4 (flame retardant) refers to a class of low-flammable and flame-retardant composite materials consisting of epoxy resin and glass fiber fabric. To improve the flame retardancy, the composite material is admixed with chemical substances such as polybrominated diphenyl ether. Printed circuit boards of class FR-4 are one of the most used printed circuit boards.

If the length L is greater than 20 millimeters, the spring body is more sensitive to external forces and thus more susceptible to damage. If the length L is less than 5 millimeters, the stiffness of the spring body is so great that a force acting on the spring body is transmitted to the spring body main body and leads there to deformations, in particular twistings. This is particularly disadvantageous when electrical components are arranged on the printed circuit board main body.

One embodiment provides for the length L to assume a value between 5 and 15 millimeters, in particular between 7 and 13 millimeters, and preferably between 9 and 11 millimeters.

An advantage of the embodiment is the greater ease of manufacture of the spring body.

One embodiment provides for the length L to assume a value between 10 and 20 millimeters, in particular between 12 and 18 millimeters, and preferably between 14 and 16 millimeters.

An advantage of the embodiment is the lower mechanical stiffness of the spring body and thus the lower force transmission to the printed circuit board main body. Thus, the printed circuit board main body deforms less when force is applied to the spring body. This minimizes the mechanical stress on solder connections, conductor tracks, or other components of the measuring device which are in mechanical contact with the printed circuit board body.

One embodiment provides for the carrier body to have a material thickness $D_{FK}$, wherein the printed circuit board main body has a material thickness $D_{GK}$, wherein the spring body has a spring body portion, wherein $D_{FK} < D_{GK}$ at least in the spring body portion.

An advantage of the embodiment is the additional adjustability of the spring stiffness of the spring constant via the choice of thickness.

An alternative embodiment provides for the spring body to have a material thickness $D_{FK}$, wherein the printed circuit board main body (39) has a material thickness $D_{GK}$, wherein the material thickness $D_{FK}$ is constant over the entire spring body, wherein $D_{GK} = D_{FK}$.

One embodiment provides for the material thickness $D_{FK}$ and/or the material thickness $D_{GK}$ to be greater than 0.5 millimeters.

One embodiment provides for the spring body to have a contact surface, wherein the spring body touches the inner surface of the housing body with the contact surface, wherein the spring body has an attachment surface, wherein the first temperature sensor is arranged on the attachment surface.

An advantage of the embodiment is an improvement in the heat transfer from the housing body to the first temperature sensor. Although metallization of the edge surfaces of printed circuit boards is known, this has not hitherto been used to improve the heat transfer. This is advantageous in particular when the first temperature sensor is not in direct mechanical contact with the inner surface of the housing body.

One embodiment provides for the printed circuit board and the printed circuit board component to be designed such that a force acts on the printed circuit board component, in particular on the spring body and preferably on the contact surface, in the direction of the printed circuit board main body, in particular a bending moment.

One embodiment provides for a contact surface plane extending through the contact surface and the printed circuit board plane extending through the attachment surface to intersect.

One embodiment provides for the contact surface to have a metal layer.

One embodiment provides for the metal layer to extend from the contact surface at least partially as far as the attachment surface, wherein the first temperature sensor is arranged at least partially on the metal layer.

Such a configuration has the advantage that the heat is effectively conducted to the first temperature sensor, and the first temperature sensor can thus react quickly to temperature changes in the medium.

One embodiment provides for the first temperature sensor to be electrically connected to a measuring circuit at least via an electrical conductor, wherein the conductor is designed as a conductor track, wherein the metal layer extends at least partially onto the conductor.

The electrical conductor can be configured to connect the first temperature sensor to a ground potential.

One embodiment provides for the housing body to have a first housing section and a second housing section, wherein the housing body has a first housing body diameter in the first housing section, wherein the housing body has a second housing body diameter in the second housing section, wherein the first housing section and the second housing section follow one another in the longitudinal direction of the housing body, wherein the first housing body diameter is smaller than the second housing body diameter, wherein the first temperature sensor touches the inner surface of the housing body in the first housing section.

An advantage of the embodiment is the greater ease of assembly and the lower force application on the printed circuit board main body via the spring body, when installing the printed circuit board in the housing. A mechanical contact between the spring body and the inner surface of the housing body is formed, and a force thus exerted on the spring body, only when the spring body is inserted into the first housing section.

In the case of a metallized contact surface, there is also less abrasion of the metal layer when the printed circuit board is inserted. Overall, the spring body experiences a lower mechanical load, as result of which the susceptibility to damage is significantly reduced.

One embodiment provides for the printed circuit board to be populated with electronic components, wherein the spring body has a spring body region, wherein the electronic components are in particular exclusively outside the spring body region.

An advantage of the embodiment is the avoidance of mechanical stress on the electronic components, in particular on the solder joints, via which they are mechanically and electrically connected to the printed circuit board. Therefore, fewer failures of electronic components occur.

One embodiment provides for the printed circuit board to be designed neither as a rigid-flex printed circuit board, nor as a semi-flex printed circuit board, nor as a flex printed circuit board.

One embodiment provides for the measuring device to comprise:

a measuring apparatus, wherein the measuring apparatus has a contacting apparatus, wherein the contacting apparatus has a first contacting component and a second contacting component, wherein the first contacting component is complementary to the second contacting component, wherein the first contacting component is arranged on the printed circuit board;

a measuring circuit, wherein the measuring circuit is formed by the electronic components,

wherein the measuring circuit is arranged on the printed circuit board, wherein the measuring circuit is electrically connected to the measuring apparatus via the contacting apparatus.

The measuring apparatus can be suitable, for example, for determining the flow rate, the fill-level, the pH, the turbidity, etc., of a medium. According to the invention, the measuring apparatus is electrically connected to the measuring circuit via the first contacting component arranged on the printed circuit board. The first contacting component is connected to the printed circuit board via a solder joint. In order to simplify the connection of the first contacting component to the second contacting component and to minimize the mechanical stress on the contacting apparatus, in particular on the solder connection, it is particularly advantageous if the spring body is resilient and flexibly movable in the printed circuit board plane. Thus, a larger spatial clearance is realized during mounting of the printed circuit board and contacting of the measuring apparatus, and, nevertheless, a secure mechanical contact is produced between the spring body and the inner surface of the housing body.

One embodiment provides for the measuring device to be a magnetically-inductive flow measuring probe.

One embodiment provides for the measuring apparatus to comprise an apparatus for generating a magnetic field, wherein the apparatus for generating the magnetic field is arranged in the housing, in particular coaxially with a housing body axis, wherein the printed circuit board has at least one printed circuit board leg, wherein the at least one printed circuit board leg extends between the apparatus for generating the magnetic field and the inner surface, wherein the first contacting component is arranged on the at least one printed circuit board leg, wherein the measuring apparatus comprises an apparatus for tapping an induced measurement voltage in a flowable medium, wherein an operating circuit is arranged on the printed circuit board, wherein the operating circuit is electrically connected to the apparatus for generating the magnetic field, wherein the operating circuit is formed by the electronic components.

a measuring circuit, wherein the measuring circuit is electrically connected to the apparatus for tapping the induced measurement voltage via the contacting apparatus, wherein the measuring circuit is formed by the electronic components.

An advantage of the embodiment is a more compact design of the magnetically-inductive flow measuring probe, and at the same time the provision of a further process variable for monitoring the medium, without an additional opening, and thus potential leakage point, in the housing.

The at least one printed circuit board leg extends in the direction of a front side of the housing. The spring body is preferably connected to the at least one printed circuit board leg. By arranging the spring body and thus also the first temperature sensor as close as possible to the front side of the housing, distortion of the first temperature value by external thermal influences can be minimized.

One embodiment provides for the housing body to have a receptacle for the printed circuit board, in particular for a printed circuit board end section of the at least one printed circuit board leg,

wherein the printed circuit board is arranged at least partially in the receptacle, wherein the receptacle is designed such that it minimizes movement of the printed circuit board in the printed circuit board end section when deformations of the printed circuit board occur.

The provision of a receptacle for the printed circuit board, in particular the printed circuit board leg, has the advantage that the mechanical forces on the solder joint of the contacting apparatus are minimized. Due to the elastic properties of the printed circuit board or of the printed circuit board body, the at least one printed circuit board leg can be bent during insertion, which makes it impossible or at least significantly more difficult to mechanically connect the first contacting component to the second contacting component. The problem is solved by providing receptacles which take over the guidance of the printed circuit board end section of the printed circuit board.

One embodiment provides for the temperature measuring apparatus to comprise a second temperature sensor, wherein the second temperature sensor is arranged in such a way, in particular on the printed circuit board, that it is in thermal contact with the apparatus for generating the magnetic field, wherein the second temperature sensor is configured to determine a second temperature value, wherein the evaluation circuit is configured to determine a corrected medium temperature as a function of the first temperature value and of the second temperature value.

When the apparatus for generating the magnetic field is used, a significant portion of the electrical energy is converted into thermal energy. This thermal influence distorts the measured values of the first temperature sensor. However, in order to provide a compact measuring device, a spatial proximity between the first temperature sensor and the apparatus for generating the magnetic field is unavoidable. The provision of a second temperature sensor which is in thermal contact with the apparatus for generating the magnetic field has the advantage that thermal influences of the apparatus for generating the magnetic field can be monitored and, if necessary, included in the determination of a corrected medium temperature.

One embodiment provides for the apparatus for generating the magnetic field to comprise a coil, wherein the coil comprises a coil wire with electrically-insulating coating, wherein the coil has a protective body, which is designed to protect the coil wire from damage by deformation of the at least one printed circuit board leg.

When the printed circuit board is inserted, mechanical stresses in or deformations of the at least one printed circuit board leg can occur due to the force acting on the spring body. This can lead to damage to the electrically-insulating coating of the coil wire and thus to failure of the apparatus for generating the magnetic field. By means of a further protective body, the application of force to the coil wire can be reduced and damage prevented.

A measuring point according to the invention comprises:

a measuring device according to the invention, a pipeline for guiding a flowable medium or a container for holding the flowable medium, wherein the pipeline or the container has an opening, wherein the measuring device is inserted into the opening.

A method according to the invention for producing a measuring device, in particular a measuring device according to the invention, comprises the method steps of:

providing a housing having a housing body, in particular a metallic housing body, a first temperature sensor, and a rigid printed circuit board;

forming a projecting spring body from the printed circuit board such that the spring body is resilient, wherein the spring body has an attachment surface provided for the first temperature sensor;

attaching the first temperature sensor to the attachment surface of the spring body;

inserting the printed circuit board into the housing in an intended position, wherein, after the arrangement of the printed circuit board, the spring body presses the temperature sensor against an inner surface of the housing.

The projecting spring body can be formed, for example, by milling. Milling is a machining manufacturing method for producing workpieces with a geometrically-defined shape, in which material in the form of chips is removed from a blank. In this case, it is particularly advantageous if the elastic properties are realized, not by the tapering of the printed circuit board, but by the projection. In this case, the spring body and the printed circuit board body have the same material thickness.

Since a printed circuit board has elastic properties, it is advantageous if, instead of providing an additional separate printed circuit board component, the latter is formed from the printed circuit board body.

Advantageous embodiments of the invention are the subject matter of the dependent claims.

One embodiment provides the method step of:

metallizing a contact surface of the spring body, wherein, after the insertion of the printed circuit board into the housing, the contact surface is in contact with the inner surface of the housing body, wherein a metal layer formed extends from the contact surface as far as the attachment surface.

Metallizing edge surfaces of a printed circuit board for applications in which an improvement in the EMC behavior by shielding the inner region of multi-layer printed circuit boards is necessary, or for board-on-board connections, is prior art. However, the metal layer of the present invention is designed and configured such that the heat of the housing body is effectively guided to the first temperature sensor.

One embodiment provides for the metal layer to extend between the attachment surface and the first temperature sensor.

One embodiment provides for the metal layer to extend as far as an electrical conductor track, wherein the conductor track is connected to the first temperature sensor.

One embodiment provides the method steps of:

orienting the printed circuit board relative to a measuring apparatus having a contacting apparatus, wherein the housing body has a first housing section and a second housing section, wherein the housing body has a first housing body diameter in the first housing section, wherein the housing body has a second housing body diameter in the second housing section, wherein the first housing section and the second housing section follow one another in the longitudinal direction of the housing body, wherein the first housing body diameter is smaller than the second housing body diameter, wherein the first temperature sensor is arranged in the second housing section during orientation, wherein the contacting apparatus has a first contacting component and a second contacting component complementary to the first contacting component, wherein the second contacting component is arranged on the printed circuit board;

forming a mechanical and electrical contact between the first contacting component and the second contacting component, wherein, when the contact is formed, the first temperature sensor is moved from the second housing section into the first housing section, wherein the spring body in the first housing section touches the inner surface of the housing body.

One embodiment provides the method step of:

introducing a flowable potting compound and curing the potting compound;

BRIEF DESCRIPTION OF THE DRAWINGS

The invention is explained in greater detail with reference to the following figures. The following are shown:

FIG. 5 shows a flowchart for describing the method steps for producing the measuring device according to the present disclosure.

DETAILED DESCRIPTION

Figure 1:
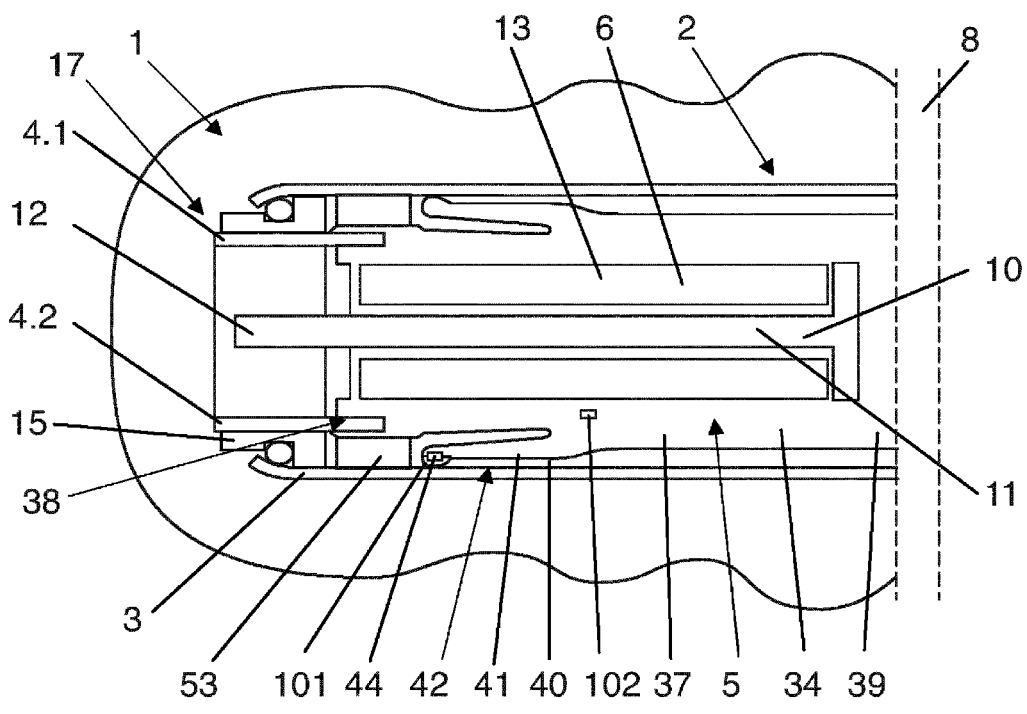
FIG. 1 shows a longitudinal section through a measuring device according to the present disclosure which is designed as a magnetically-inductive flow measuring probe and is inserted into a measuring point.

FIG. 1 shows a longitudinal section through a measuring device according to the invention which is designed as a magnetically-inductive flow measuring probe 1 and is inserted into a pipeline 8. The magnetically-inductive flow measuring probe 1 has a housing 2, which has a metallic housing body 3 and a front body 15 arranged on the end face. The front body 15 contains an electrically-insulating material or is formed from an electrically-insulating material. A part of the measuring apparatus is arranged in the front body 15—in this case, an apparatus 17 for tapping an induced measurement voltage in a flowing conductive medium—consisting of a first measuring electrode 4.1 and a second measuring electrode 4.2. The apparatus 17 for tapping the induced measurement voltage is electrically connected to a measuring circuit, which is configured to measure a voltage applied to the apparatus 17 for tapping the induced measurement voltage. Located in the interior of the housing body 3 is an apparatus 5 for generating a magnetic field. The apparatus 5 for generating the magnetic field comprises a coil arrangement 6 with exactly one coil 13, which is electrically connected to an operating circuit, and a field guiding body 10, which has a coil core 11 extending through an opening of the coil 13 as far as a receptacle in the front body 15. The end section of the field guiding body 10 is designed as a pole shoe 12, which serves to introduce the generated magnetic field at the end face as homogeneously as possible into the section between the first measuring electrode 4.1 and the second measuring electrode 4.2. The operating circuit is configured to apply an operating signal, which has a temporally-variable voltage or current profile, to the coil 13. The measuring circuit and operating circuit are formed from electronic components which are arranged on a rigid printed circuit board 34, i.e., with a minimum thickness of 0.5 millimeters, in particular 0.8 millimeters, and preferably 1 millimeter. The printed circuit board 34 is further designed and configured to electrically connect the apparatus 17 for tapping the induced measurement voltage to the measuring circuit, and to electrically connect the apparatus 5 for generating the magnetic field to the operating circuit. The printed circuit board 34 has two printed circuit board legs 37, which each extend from a printed circuit board main body 39, in a space formed by the coil 13 and the inner surface of the housing body 3, in the direction of the front body 15. The printed circuit board legs 37 are mechanically and electrically connected to the first measuring electrode 4.1 and the second measuring electrode 4.2 in the printed circuit board leg end section 38. In addition, the printed circuit board legs 37 in the printed circuit board leg end section 38 are located in a receptacle 53, which serves to guide the printed circuit board legs 37 during insertion, so that the formation of the electrical and mechanical connection is particularly user-friendly, and the mechanical stress in the printed circuit board remains minimal. Furthermore, the printed circuit board legs 37 each have a printed circuit board component 40, which, in the depicted embodiment, are formed as spring bodies 41 which are connected monolithically to the printed circuit board leg 37. The spring bodies 41 protrude from the printed circuit board 34, in particular in this case from the respective printed circuit board legs 37, and are bendable or flexible in a printed circuit board plane. In addition, the spring bodies 41 touch the inner surface of the housing body 3. The spring body 41 has a spring body portion 42, in which no electronic components are arranged. According to the invention, the spring body 41 can have a smaller thickness in the spring body portion 42 than the printed circuit board 34 or the printed circuit board leg 37. At least one of the spring bodies 41 has, in the longitudinal direction of the spring body 41, an extension with a length L, the length L assuming a value between 5 and 20 millimeters. In addition, at least one spring body 41 has, transverse to the longitudinal direction of the spring body 41 and in the direction of the printed circuit board main body or printed circuit board leg 37, an extension with length B, the length B preferably being greater than 1.2 millimeters. A portion of the at least one spring body 41 has a distance X from the printed circuit board main body, the distance X being at least 1.6 millimeters. The spring bodies 41 are at least partially cuboid. A first temperature sensor 101 in the form of an NTC thermistor is arranged on a front section of the at least one spring body 41. The first temperature sensor 101 is electrically connected to the measuring circuit via a conductor track. Furthermore, the front section of the spring body 41 has a metal layer 44, which is designed to conduct the heat on the inner surface of the housing body 3 to the first temperature sensor 101 in order thus to detect temperature changes of the medium more quickly. The first temperature sensor 101 is part of a temperature measuring apparatus that, according to the depicted embodiment, comprises a second temperature sensor 102 which is in thermal contact with the coil 13 and is electrically connected to the measuring circuit. The measuring circuit is configured to determine a measured variable dependent upon the medium temperature on the basis of the first temperature sensor 101 and to determine a further measured variable with the second temperature sensor 102. An evaluation circuit is configured to determine a corrected medium temperature as a function of the measured variable, dependent upon the medium temperature, and of the further measured variable.

Figure 2:
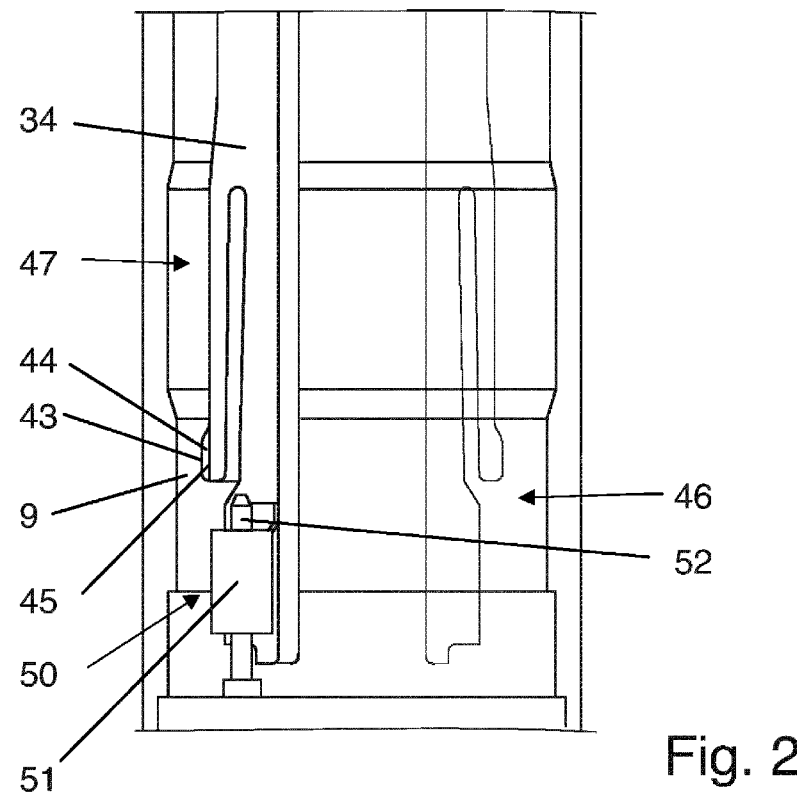
FIG. 2 shows a sectional view through a further embodiment of the measuring device.

FIG. 2 shows a partial detail of a sectional view through an embodiment of the measuring device according to the invention. The housing body 3 has a first housing section 46 and a second housing section 47, which follow one another in the longitudinal direction of the housing body 3. The housing body 3 has a first housing body diameter in the first housing section 46 and a second housing body diameter in the second housing section 47. The first housing body diameter is smaller than the second housing body diameter. The second housing section 47 serves to minimize the force applied to the printed circuit board via the spring body 41 during the assembly of the printed circuit board. At the same time, abrasion of the metal layer 44 applied to the contact surface 43 is minimized. In the final, installed state, the spring body 41 touches the inner surface 9 of the housing body 3 in the first housing section 46, at least in places. The surface of the spring body which is in contact with the inner surface of the housing body 3 is referred to as contact surface 43 and, according to the invention, has a metal layer 44 which serves to improve the thermal contact between the first temperature sensor and the housing body 3. The spring body 41 has an attachment surface 45 on an end section, on which attachment surface the first temperature sensor (not shown in FIG. 2) is arranged. The metal layer 44 can extend as far as the attachment surface 45, as a result of which a better heat transfer from the housing body to the first temperature sensor is realized. FIG. 2 furthermore shows a measuring apparatus, which is arranged in a front body and has a contacting apparatus 50. The contacting apparatus 50 consists of a first contacting component 51 and a second contacting component 52, wherein the first contacting component 51 is complementary to the second contacting component 52 and is arranged on the printed circuit board 34, in particular on a printed circuit board leg projecting from a printed circuit board main body. A measuring circuit (not shown in FIG. 2, but in FIG. 3) is formed from electronic components which are arranged on the printed circuit board 34 and electrically connected to the measuring apparatus via the contacting apparatus 50.

Figure 3:
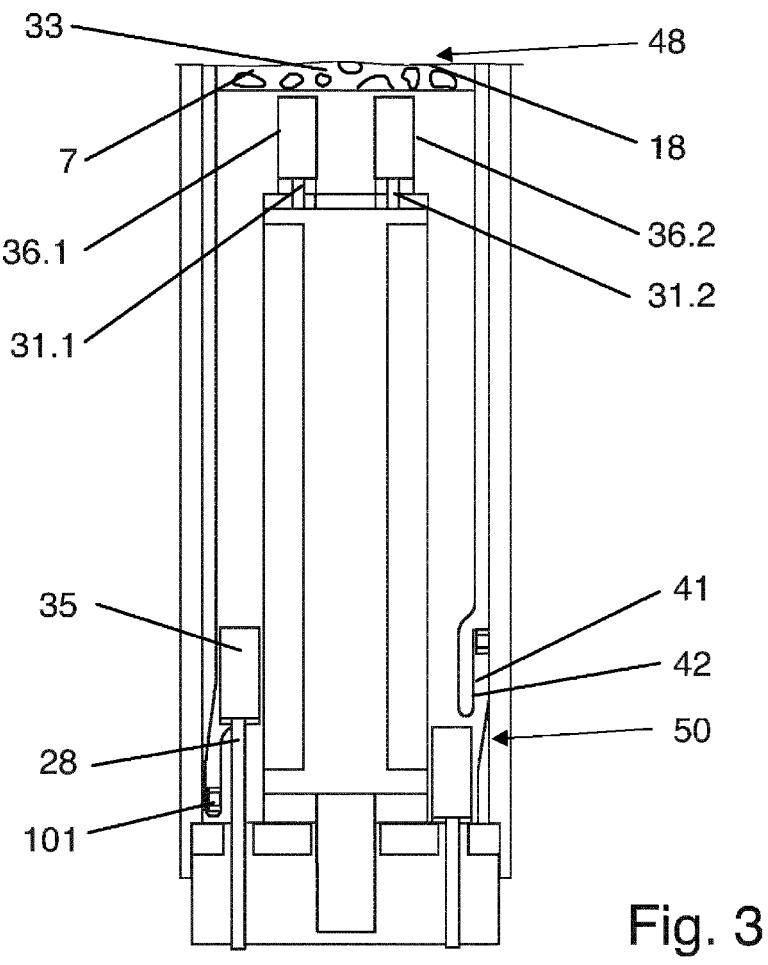
FIG. 3 shows a longitudinal section through a further measuring device according to the present disclosure, which device is configured as a magnetically-inductive flow measuring probe.

FIG. 3 shows a longitudinal section through a further measuring device according to the invention, which device is configured as a magnetically-inductive flow measuring probe. The measuring device has, in a housing interior, a printed circuit board 34, which is populated with electronic components 48. On the one hand, these electronic components 48 form the operating circuit, the measuring circuit, and the evaluation circuit 18, which is designed to determine a measured value of a process variable as a function of a measurement signal from the measuring apparatus. The measuring apparatus has measuring electrodes, which each have measuring electrode contacting elements 28, via which they can be detachably connected to the measuring circuit by measuring electrode mating contacting elements 35 arranged on the printed circuit board. The measuring apparatus also has a coil, which comprises a first coil contacting element 31.1 and a second coil contacting element 31.2, via which a disconnectable electrical connection to the operating circuit can be established with the aid of coil mating contacting elements 36.1, 36.2 arranged on the printed circuit board. The printed circuit board has two projecting spring bodies 41, each having a spring body region 42. The spring bodies 41 extend in opposite directions from the printed circuit board body and each touch the inner surface of the housing body. The spring body 41 with an extension in the direction of the front body has a first temperature sensor 101 in a spring body end section. An exact temperature measurement of the medium close to the measuring apparatus is thus made possible. The spring body 41 with an extension in the opposite direction to the front body has a further temperature sensor in a spring body end section. Such a configuration has the advantage that the frequency of breaking off the spring body during the insertion of the printed circuit board is minimized. The electronic components 48 are arranged exclusively outside the spring body region 42 so as to minimize the mechanical stress on the solder joints. The two measuring electrode mating contacting elements 35 are arranged offset to one another in the longitudinal direction of the housing body. Likewise, one of the temperature sensors 101 is arranged in the longitudinal direction between the measuring electrode mating contacting element 35 and the front body, in order thus to arrange the temperature sensor as far away as possible from thermal interferences. The contacts are arranged offset in the longitudinal direction of the housing.

Figure 4:
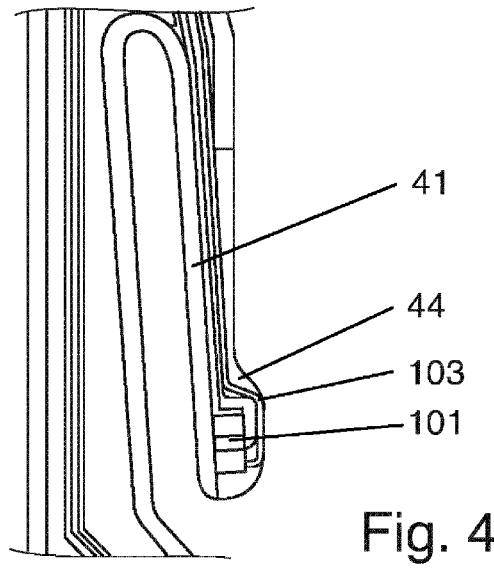
FIG. 4 shows a close-up view of a resilient printed circuit board component and the provided conductor tracks for contacting the first temperature sensor.

FIG. 4 shows a close-up view of a resilient printed circuit board component in the form of a spring body 41, formed from the printed circuit board body, and the provided conductor tracks 103 for contacting the first temperature sensor 101. The spring body 41 has a contact surface, through which a contact surface plane extends, which is oriented perpendicularly to the printed circuit board plane. This contact surface serves to be brought into mechanical contact with the inner surface of the housing body. This contact surface has a metal layer which, in the installed state of the printed circuit board, touches the inner surface of the housing body. The spring body 41 has an attachment surface on which the first temperature sensor 101 is to be arranged. The metal layer 44 extends from the contact surface at least partially as far as the attachment surface. A good thermal connection between the inner surface of the housing body and the first temperature sensor 101 is thus produced. Furthermore, the first temperature sensor 101 is electrically connected to a measuring circuit at least via an electrical conductor track 103. In the depicted embodiment, the metal layer 44 extends at least partially as far as the conductor track 103.

FIG. 5 shows a flowchart for describing individual method steps which are necessary in a method for producing the measuring device according to the invention:

providing a housing having a housing body, in particular a metallic housing body, a first temperature sensor, and a printed circuit board;

The printed circuit board comprises a printed circuit board body and electronic components thereon. In addition, the printed circuit board has a solder joint on which a first temperature sensor is to be arranged. The solder joint is electrically connected via conductor tracks to a measuring circuit formed from the electronic components, and the measuring circuit is designed to determine a medium temperature-dependent measurement signal by means of the first temperature sensor.

forming a projecting spring body from the printed circuit board such that the spring body is resilient;

metallizing a contact surface of the spring body, wherein a metal layer formed extends from the contact surface as far as the attachment surface for the first temperature sensor.

attaching the first temperature sensor to an attachment surface provided on the spring body, in particular on the provided solder joint;

inserting the printed circuit board into the housing into an intended position, wherein the spring body is pressed against an inner surface of the housing upon insertion;

forming a mechanical and electrical contact between the first contacting component of a measuring apparatus and the second contacting component on the printed circuit board.

The production method can comprise further method steps which are necessary for forming the measuring device, but are not part of the core idea according to the invention.

The invention claimed is:

1. A measuring device for determining a process variable of a medium, comprising:

a housing, wherein the housing comprises a housing body, wherein the housing body has an inner surface;

a temperature measuring apparatus, wherein the temperature measuring apparatus comprises a first temperature sensor, wherein the first temperature sensor is configured to determine a first temperature value, wherein the temperature measuring apparatus comprises an evaluation circuit, wherein the evaluation circuit is configured to determine a medium temperature as a function of the first temperature value;

a rigid printed circuit board, wherein the printed circuit board has a resilient printed circuit board component, wherein the first temperature sensor is arranged on the printed circuit board component, wherein the printed circuit board component at least partially touches the inner surface of the housing body;

wherein the printed circuit board has a spring body, wherein the spring body has a contact surface, wherein the spring body touches the inner surface with the contact surface, wherein the spring body has an attachment surface, wherein the first temperature sensor is arranged on the attachment surface.

2. The measuring device according to claim 1, wherein the printed circuit board has a rigid printed circuit board main body, wherein the spring body and the printed circuit board main body are formed monolithically.

3. The measuring device according to claim 2, wherein the spring body projects at least partially from the printed circuit board main body.

4. The measuring device according to claim 2, wherein the spring body is elastically deformable, at least in a printed circuit board plane.

5. The measuring device according to claim 2, wherein the spring body in the longitudinal direction of the spring body has an extension with a length L, the length L assuming a value between 5 and 20 millimeters.

6. The measuring device according to claim 5, wherein the length L assumes a value between 5 and 15 millimeters.

7. The measuring device according to claim 5, wherein the length L assumes a value between 10 and 20 millimeters.

8. The measuring device according to claim 2, wherein the spring body has a material thickness $D_{FK}$, wherein the printed circuit board main body has a material thickness $D_{GK}$, wherein the spring body has a spring body region, wherein $D_{FK} < D_{GK}$ in the spring body region.

9. The measuring device according to claim 2, wherein the spring body has a material thickness $D_{FK}$, wherein the printed circuit board main body has a material thickness $D_{GK}$, wherein the material thickness $D_{FK}$ is constant over the entire spring body, wherein $D_{GK} = D_{FK}$.

10. The measuring device according to claim 8, wherein the material thickness $D_{FK}$ and/or the material thickness $D_{GK}$ are greater than 0.5 millimeters.

11. The measuring device according to claim 1, wherein the printed circuit board and the printed circuit board component are designed such that a force acts on the printed circuit board component, in particular on the spring body and preferably on the contact surface, in the direction of the printed circuit board main body, in particular a bending moment.

12. The measuring device according to claim 1, wherein a contact surface plane extending through the contact surface and the printed circuit board plane extending through the attachment surface intersect.

13. The measuring device according to claim 1, wherein the contact surface has a metal layer.

14. The measuring device according to claim 13, wherein the metal layer extends from the contact surface at least partially as far as the attachment surface, wherein the first temperature sensor is arranged at least partially on the metal layer.

15. The measuring device according to claim 13, wherein the first temperature sensor is electrically connected to a measuring circuit at least via an electrical conductor track, wherein the metal layer extends at least partially onto the conductive track.

16. The measuring device according to claim 1, wherein the housing body has a first housing section and a second housing section, wherein the housing body has a first housing body diameter in the first housing section, wherein the housing body has a second housing body diameter in the second housing section, wherein the first housing section and the second housing section follow one another in the longitudinal direction of the housing body, wherein the first housing body diameter is smaller than the second housing body diameter, wherein the spring body at least partially touches the inner surface of the housing body in the first housing section.

17. The measuring device according to claim 1, wherein the printed circuit board is populated with electronic components, wherein the spring body has a spring body region, wherein the electronic components are arranged in particular exclusively outside the spring body region.

18. The measuring device according to claim 17, comprising:
a measuring apparatus,
wherein the measuring apparatus has a contacting apparatus,
wherein the contacting apparatus has a first contacting component and a second contacting component,
wherein the first contacting component is complementary to the second contacting component,
wherein the first contacting component is arranged on the printed circuit board;
a measuring circuit,
wherein the measuring circuit is formed by the electronic components,
wherein the measuring circuit is arranged on the printed circuit board,
wherein the measuring circuit is electrically connected to the measuring apparatus via the contacting apparatus.

19. The measuring device according to claim 18, wherein the measuring apparatus comprises an apparatus for generating a magnetic field, wherein the apparatus for generating the magnetic field is arranged in the housing, wherein the printed circuit board has at least one printed circuit board leg, wherein the at least one printed circuit board leg extends between the apparatus for generating the magnetic field and the inner surface, wherein the first contacting component is arranged on the at least one printed circuit board leg, wherein the measuring apparatus comprises an apparatus for tapping an induced measurement voltage in a flowable medium, wherein an operating circuit is arranged on the printed circuit board, wherein the operating circuit is electrically connected to the apparatus for generating the magnetic field, wherein the operating circuit is formed by the electronic components; a measuring circuit, wherein the measuring circuit is electrically connected to the apparatus for tapping the induced measurement voltage via the contacting apparatus, wherein the measuring circuit is formed by the electronic components.

20. The measuring device according to claim 1, wherein the printed circuit board is designed neither as a rigid-flex printed circuit board, nor as a semi-flex printed circuit board, nor as a flex printed circuit board.

* * * * *